R. E. McCULLEY, W. G. REA & D. B. FORWARD.
CULTIVATOR TOOTH.
APPLICATION FILED SEPT. 25, 1913.
1,108,600.
Patented Aug. 25, 1914.
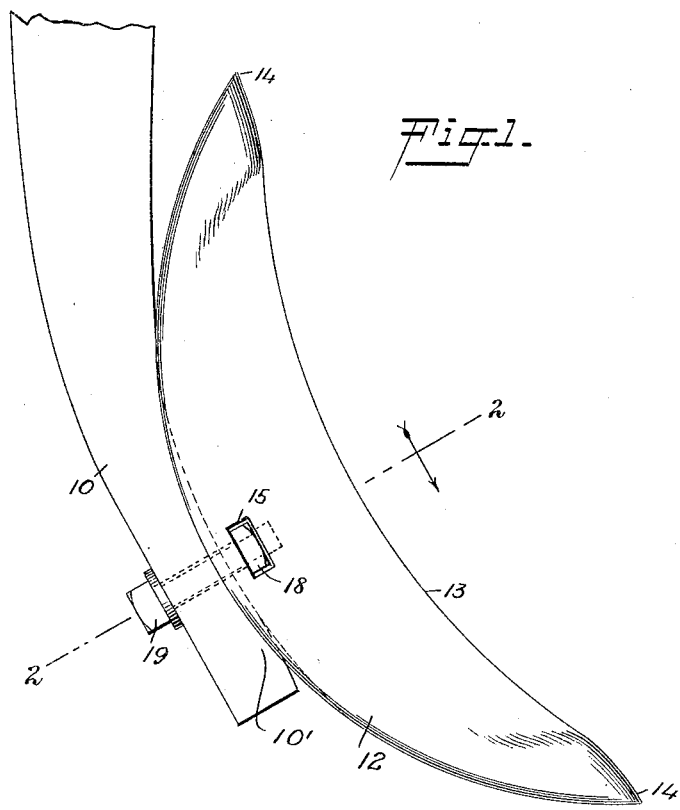
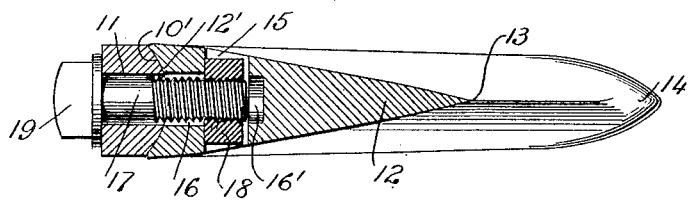
WITNESSES
INVENTORS
ROBERT E. McCULLEY
WALTER G. REA
DRYDEN B. FORWARD
BY
ATTORNEYS
THE NORRIS PETERS CO., PHOTO-LITHO., WASHINGTON, D. C.

UNITED STATES PATENT OFFICE.

ROBERT E. McCULLEY, WALTER G. REA, AND DRYDEN BLAIR FORWARD, OF CEDARVILLE, CALIFORNIA.

CULTIVATOR-TOOTH.

1,108,600.   Specification of Letters Patent.   Patented Aug. 25, 1914.

Application filed September 25, 1913. Serial No. 791,772.

*To all whom it may concern:*

Be it known that we, ROBERT E. MCCULLEY, WALTER G. REA, and DRYDEN B. FORWARD, citizens of the United States, and residents of Cedarville, in the county of Modoc and State of California, have invented a new and Improved Cultivator-Tooth, of which the following is a full, clear, and exact description.

This invention relates to agricultural implements and has particular reference to cultivators and diggers.

Among the objects of the invention is to provide a cultivator tooth of peculiar construction and adaptation, the same being detachably connected to a cultivator post in such a manner as to be capable of reversal from one end to the other, whereby the efficiency of the tooth is increased.

A further object of the invention is to improve the means for securing a device of this character adjustably or removably to the cultivator post.

The foregoing and other objects of this invention will hereinafter be more fully described and claimed and illustrated in the drawings forming a part of this specification in which like characters of reference indicate corresponding parts in both the views, and in which—

Figure 1 is a side elevation of the device in working position; and Fig. 2 is a transverse section on the line 2—2 of Fig. 1.

The several parts of the device may be made of any suitable materials, and the relative sizes and proportions thereof may be varied to a considerable extent without departing from the spirit of the invention hereinafter more fully set forth and specifically claimed.

At 10 we show the lower end of a cultivator beam or post having the front face thereof rounded, as shown at 10′, and being provided with a bolt hole 11 extending therethrough from front to rear. Indicated at 12 is a cultivator tooth, the same being substantially crescent shaped as viewed in side elevation, and having its back provided with a concavity 12′ adapted to conform to the rounded face 10′ of the post whereby the attachment means are made more effective.

The body of the tooth is substantially triangular in cross section, as shown in Fig. 2, being provided along its front with a sharp cutting edge 13 and being provided at its ends with points 14, the cutting edge 13, however, terminating at points remote from the extreme points 14 whereby the tooth points 14 are strengthened and made more durable in practice. This device is especially adapted for use in loosening up sod bound meadows and the effective point 14 thereof is adapted to operate sufficiently deep to go below the grass roots; hence the cutting of said roots is effected entirely by the cutting edge 13.

As illustrated, the device is symmetrical and adapted to be reversed from one end to the other so that when one end becomes dull or damaged, the tooth may be swung around the point of connection with the post and so secured as to bring the other end into operation.

The back and middle portion of the tooth is provided with a transverse socket 15 which is intersected by a hole 16 drilled from the back therethrough and preferably slightly beyond, as shown at 16′, so as to receive the fastening bolt 17. The socket 15 is slightly, if any, larger than the nut 18, and hence prevents rotation of the nut. Upon application of a wrench to the head 19 of the bolt it may be so turned as to securely clamp the tooth 12 in position ready for operation. In order to reverse the tooth, the bolt will be loosened by reverse turning far enough so that the concave portion of the back will freely pass the convexity of the post. The peculiar form of the tooth, both as to its crescent shape and its triangular form in cross section, renders it exceedingly strong in proportion to the mass of material.

Having thus described our invention, we claim as new and desire to secure by Letters Patent:—

A cultivator tooth of the character set forth substantially crescent-shaped in side view, the body portion thereof being solid and of an acute triangular form in cross section, the acute angle constituting the front cutting edge, and the back thereof being formed with a transverse socket and a
5 bolt hole leading from the rear surface of the tooth into and extending beyond said socket, substantially as and for the purposes set forth.

In testimony whereof we have signed our names to this specification in the presence of two subscribing witnesses.

ROBERT E. McCULLEY.
WALTER G. REA.
DRYDEN BLAIR FORWARD.

Witnesses:
F. E. Bush,
H. L. Merryfield.

Copies of this patent may be obtained for five cents each, by addressing the "Commissioner of Patents, Washington, D. C."